United States Patent
Boutaghou

(10) Patent No.: US 6,219,332 B1
(45) Date of Patent: *Apr. 17, 2001

(54) SLIDER FOR OPTICAL DISC DATA STORAGE SYSTEM

(75) Inventor: Zine-Eddine Boutaghou, Vadnais Heights, MN (US)

(73) Assignee: Seagate Technology LLC, Scotts Valley, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/245,511

(22) Filed: Feb. 5, 1999

Related U.S. Application Data

(62) Division of application No. 08/920,243, filed on Aug. 28, 1997, now Pat. No. 5,870,362.
(60) Provisional application No. 60/050,409, filed on Jun. 20, 1997.

(51) Int. Cl.[7] .............................. G11B 17/33; G11B 21/21
(52) U.S. Cl. ......................................... 369/300; 360/234.3
(58) Field of Search ..................................... 360/114, 230, 360/234, 234.3, 234.7, 235.6, 235.7, 236.4, 236.5, 237.1; 369/300

(56) References Cited

U.S. PATENT DOCUMENTS

| | | | |
|---|---|---|---|
| 3,980,811 | 9/1976 | Schaefer et al. | 178/6.6 |
| 4,229,067 | 10/1980 | Love | 350/96.15 |
| 4,310,916 | 1/1982 | Dil | 369/109 |
| 4,443,700 | 4/1984 | Macedo et al. | 250/227 |
| 4,569,038 | 2/1986 | Nagashima et al. | 369/44 |
| 4,581,529 | 4/1986 | Gordon | 250/227 |
| 4,706,235 | 11/1987 | Melbye | 369/46 |
| 4,769,800 | 9/1988 | Moser et al. | 369/32 |
| 4,815,064 | 3/1989 | Melbye | 369/59 |
| 4,933,537 | 6/1990 | Takahashi et al. | 235/454 |

(List continued on next page.)

FOREIGN PATENT DOCUMENTS

| | | | |
|---|---|---|---|
| 2-185729 | * | 7/1990 | (JP) . |
| 97/14140 | * | 4/1997 | (WO) . |
| 99/05679 | * | 2/1999 | (WO) . |
| 99/09547 | * | 2/1999 | (WO) . |

Primary Examiner—William Klimowicz
(74) Attorney, Agent, or Firm—Westman, Champlin & Kelly, P.A.

(57) ABSTRACT

An optical disc data storage system includes an optical disc having a data surface. An actuator arm having a distal end is selectively radially positionable adjacent the data surface. A transducing element is carried on a slider which is coupled to the distal end of the actuator arm. The slider includes an air bearing surface and the transducing element includes an optical mesa adjacent the air bearing surface. The optical mesa is spaced apart from the data surface whereby contact between the data surface and the mesa structure is prevented.

8 Claims, 5 Drawing Sheets

U.S. PATENT DOCUMENTS

| | | | |
|---|---|---|---|
| 4,994,658 | 2/1991 | Takahashi et al. | 235/473 |
| 5,004,307 | 4/1991 | Kino et al. | 350/1.2 |
| 5,031,055 | 7/1991 | Yanagisawa | 360/75 |
| 5,096,277 | 3/1992 | Kleinerman | 385/12 |
| 5,125,750 | 6/1992 | Corle et al. | 359/819 |
| 5,138,676 | 8/1992 | Stowe et al. | 385/32 |
| 5,153,870 | 10/1992 | Lee et al. | 369/111 |
| 5,193,132 | 3/1993 | Uken et al. | 385/32 |
| 5,200,867 * | 4/1993 | Albrecht et al. | 360/103 |
| 5,212,379 | 5/1993 | Nafarrate et al. | 250/227.14 |
| 5,278,812 | 1/1994 | Adar et al. | 369/44.12 |
| 5,286,971 | 2/1994 | Betzig et al. | 250/227.26 |
| 5,363,463 | 11/1994 | Kleinerman | 385/123 |
| 5,406,432 | 4/1995 | Murray | 360/103 |
| 5,450,203 | 9/1995 | Penkethman | 356/373 |
| 5,490,025 | 2/1996 | Dorius et al. | 360/103 |
| 5,493,393 | 2/1996 | Beranek et al. | 356/328 |
| 5,497,359 | 3/1996 | Mamin et al. | 369/44.15 |
| 5,499,149 | 3/1996 | Dovek | 360/103 |
| 5,504,731 | 4/1996 | Lee et al. | 369/44.14 |
| 5,535,189 | 7/1996 | Alon et al. | 369/102 |
| 5,537,385 | 7/1996 | Alon et al. | 369/119 |
| 5,566,159 | 10/1996 | Shapira | 369/99 |
| 5,568,466 * | 10/1996 | Komaki et al. | 369/275.2 |
| 5,574,712 | 11/1996 | Alon et al. | 369/102 |
| 5,592,444 | 1/1997 | Alon et al. | 369/13 |
| 5,598,393 | 1/1997 | Alon et al. | 369/102 |
| 5,625,512 | 4/1997 | Smith | 360/103 |
| 5,715,226 | 2/1998 | Shimano et al. | 369/112 |
| 5,768,056 * | 6/1998 | Boutaghou et al. | 360/103 |
| 5,831,797 * | 11/1998 | Schaenzer et al. | 360/114 |
| 5,841,608 * | 11/1998 | Kasamatsu et al. | 360/103 |
| 5,870,362 * | 2/1999 | Boutaghou | 369/44.14 |
| 5,881,042 * | 3/1999 | Knight | 369/99 |
| 5,970,038 * | 10/1999 | Boutaghou et al. | 369/112 |
| 5,986,851 * | 11/1999 | Angelo et al. | 360/103 |
| 5,991,119 * | 11/1999 | Boutaghou et al. | 360/103 |
| 6,016,239 * | 1/2000 | Mizuno et al. | 360/104 |
| 6,023,378 * | 2/2000 | Schaenzer | 359/819 |
| 6,040,958 * | 3/2000 | Yamamoto et al. | 360/103 |
| 6,069,853 * | 5/2000 | Novotny et al. | 369/13 |

\* cited by examiner

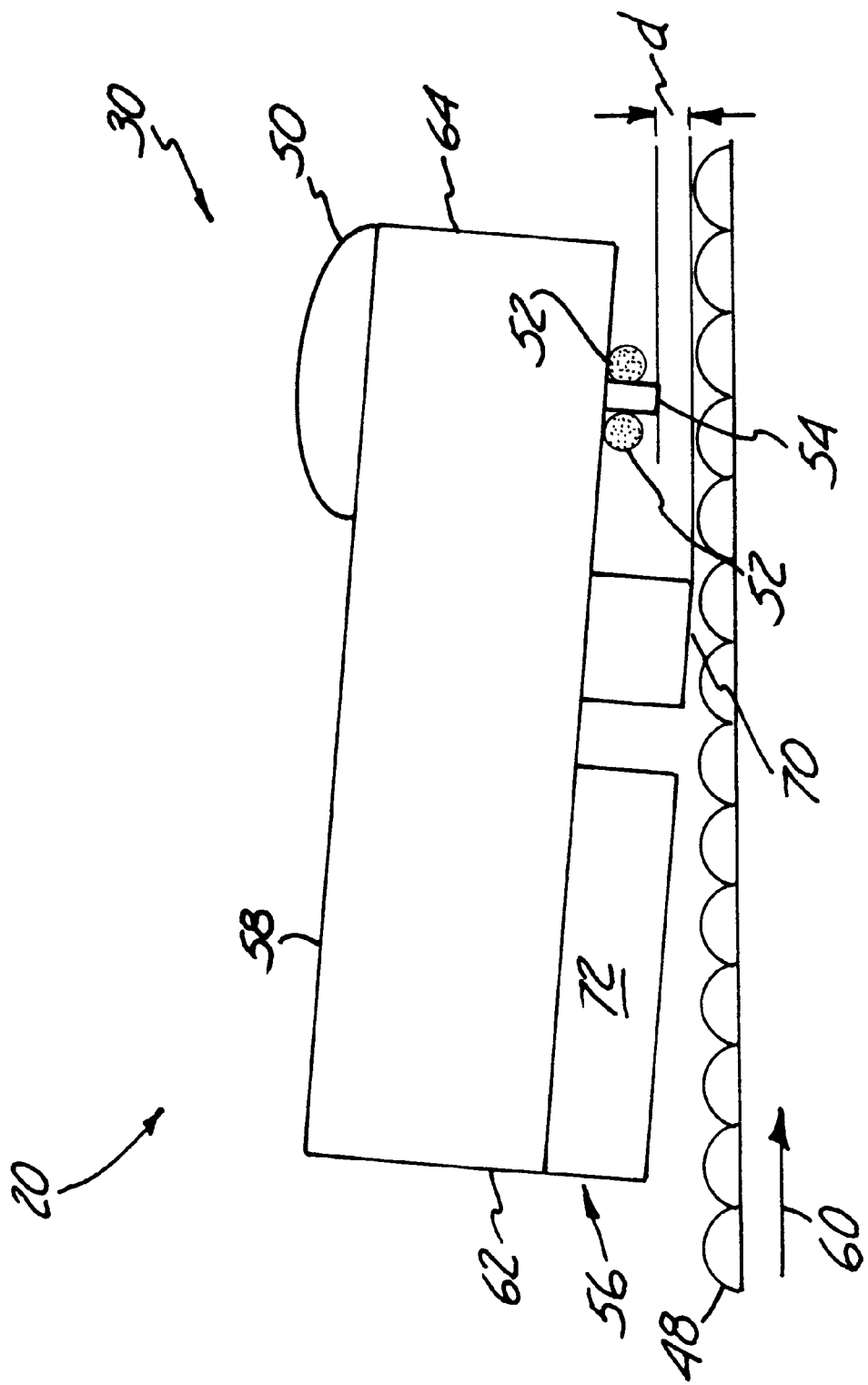

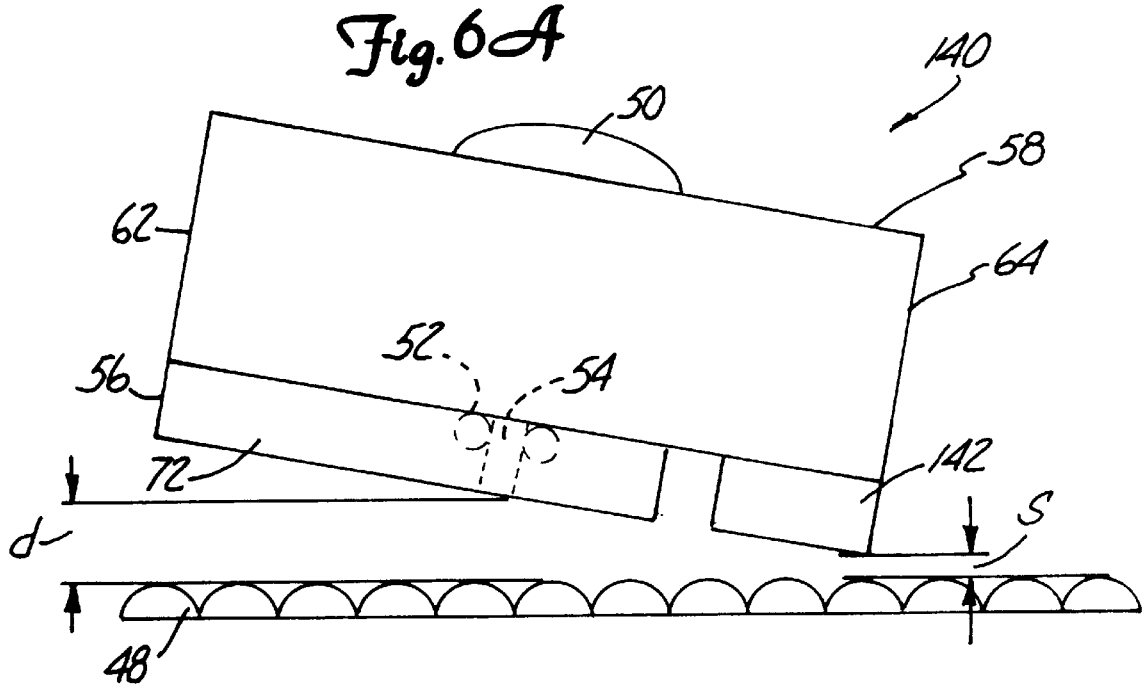
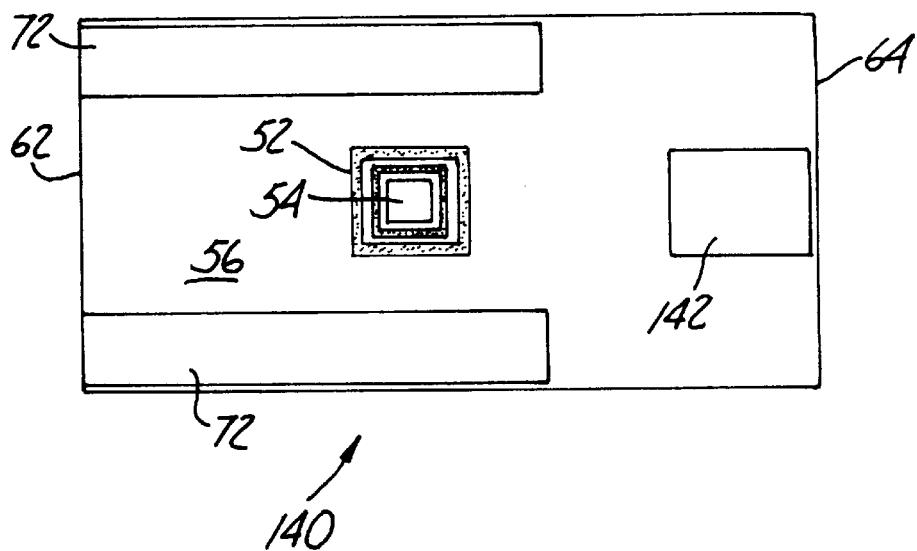

SLIDER FOR OPTICAL DISC DATA STORAGE SYSTEM

This is a Divisional patent application of U.S. Ser. No. 08/920,243, filed Aug. 28, 1997 now U.S. Pat. No. 5,870,362, which is based on Provisional application No. 60/050,409, filed on Jun. 20, 1997.

BACKGROUND OF THE INVENTION

The present invention relates generally to optical disc data storage systems. More specifically, the present invention relates to a slider for use in an optical head gimbal assembly of an optical disc data storage system.

Optical data storage disc systems are a promising technology for storing large quantities of data. The data is accessed by focusing a laser beam onto a data surface of the disc and detecting light reflected from or transmitted through the data surface.

In general, in optical storage systems, data is in the form of physical or magnetic marks carried on the surface of the disc which are detected using the reflected laser light. There are a number of different optical disc technologies which are known in the industry. For example, compact discs are currently used to store digital data such as computer programs or digitized music. Typically, compact discs are permanently recorded during manufacture. Another type of optical system is write-once read-many (WORM) systems in which a user may permanently write information onto a blank disc. It is also desirable to provide a system which is erasable, such as phase change and magneto-optic (M-O) systems. Phase change systems detect data by sensing a change in reflectivity. M-O systems read data by measuring the rotation of the incident light polarization due to the storage medium.

High density optical recording, particularly for near-field recording (i.e., M-O or phase change systems) typically requires an optical head gimbal assembly (OHGA) for carrying the transducing device over the data surface of the optical media. The OHGA includes a slider which "flies" proximate the data surface of the optical disc as the disc rotates at a high speed. An actuator is used to radially position the slider over the disc surface. U.S. Pat. No. 5,497,359 shows an example of a slider for use with an optical disc data storage system.

Optical disc data storage systems which use the "near field" (or evanescent field) include a Solid Immersion Lens (SIL). Such near field technology is shown in U.S. Pat. No. 5,125,750 to Corle et al. which issued Jun. 30, 1992 entitled "OPTICAL RECORDING SYSTEM EMPLOYING A SOLID IMMERSION LENS" and in U.S. Pat. No. 5,497,359 to Mamin et al. entitled "OPTICAL DISC DATA STORAGE SYSTEM WITH RADIATION-TRANSPARENT AIR-BEARING SLIDER" which issued Mar. 5, 1996. Typical SIL structures include a hemispherical lens cap positioned on a top side of the slider and an optical mesa structure positioned on the air bearing side of the slider. The optical mesa must be positioned very close to the data surface of the optical disc in order for their to be near field optical coupling. Typically this is on the order of less than a few wavelengths.

SUMMARY OF THE INVENTION

The present invention provides a slider having a mesa which is protected from contact with the optical disc data storage system. In an optical disc data storage system, an optical disc includes a data surface. An actuator arm having a distal end is selectively radially positioned adjacent the data surface. A transducing element including an optical source is provided for transducing information. A controller coupled to the actuator arm and the transducing element positions the actuator arm and transduces information on the data surface through the transducing element. A slider coupled to the distal end of the actuator arm carries the transducing element. The slider includes a top surface, and an air bearing surface adapted to move adjacent the data surface as the disc rotates. A mesa is carried on the air bearing surface. In one aspect of the present invention, the air bearing surface includes a protrusion. The optical mesa is spaced apart from the protrusion in a direction away from the data surface whereby the protrusion prevents contact between the data surface and the optical mesa. Another aspect of the invention includes pitching the slider whereby the mesa does not contact the data surface.

BRIEF DESCRIPTION OF THE DRAWINGS

FIG. 2 is a side plan view of the slider of FIG. 1 in accordance with one embodiment of the present invention.

FIG. 6A is a side plan view and FIG. 6B is a bottom plan view of a slider in accordance with another embodiment in which the pitch of the slider is used to space the mesa apart from a data surface of an optical disc.

DETAILED DESCRIPTION OF THE PREFERRED EMBODIMENTS

The present invention relates to optical data storage systems. In particular, the present invention relates to sliders for use with optical data storage systems which employ near-field (or evanescent field) optical recording techniques having a slider for carrying a transducing head to optically couple to a data surface to read and/or write information thereon. Such optical data storage systems use a slider to carry the optical transducing elements adjacent the data surface of an optical storage medium such as an optical disc. U.S. Pat. No. 5,497,359 issued Mar. 5, 1996 entitled "OPTICAL DISC DATA STORAGE SYSTEM WITH RADIATION-TRANSPARENT AIR-BEARING SLIDER" illustrates one slider designed for optical recording.

When optically recording information using the near field (or evanescent field) the optical transducing element includes, for example, a Solid Immersion Lens (or SIL) carried on the slider which flies over the magnetic disc. Such a Solid Immersion Lens is shown in U.S. Pat. No. 5,125,750, entitled "OPTICAL RECORDING SYSTEM EMPLOYING A SOLID IMMERSION LENS." To write a bit of data on the disc, a laser heats up a small spot on the disc through the Solid Immersion Lens to a temperature above the Curie temperature of the medium. A magnetic coil carried on the air bearing surface of the slider is energized and the laser is turned off. As the magnetic medium cools below the Curie point, the heated spot is left with the desired magnetic orientation.

Solid Immersion Lenses include a hemispherical pattern or lens cap positioned on a top surface of the slider and an opposed optical mesa located on the air bearing surface of the slider. One aspect of the present invention is the recognition that the optical mesa is a key element in optical recording and even minor degradation in its optical characteristics can significantly affect system performance. In typical prior art sliders, no effort was made to protect the mesa from undesirable contact with the data surface. Further, in typical prior art systems it was possible for particulate build up to occur on or in the vicinity of the mesa. These conditions can change the optical properties of the mesa. The present invention further includes recession of the mesa relative to a protrusion which extends from the air bearing surface. The protrusion thereby ensures that the mesa is always spaced apart from the data surface during operation of the optical disc storage system.

Figure 1:
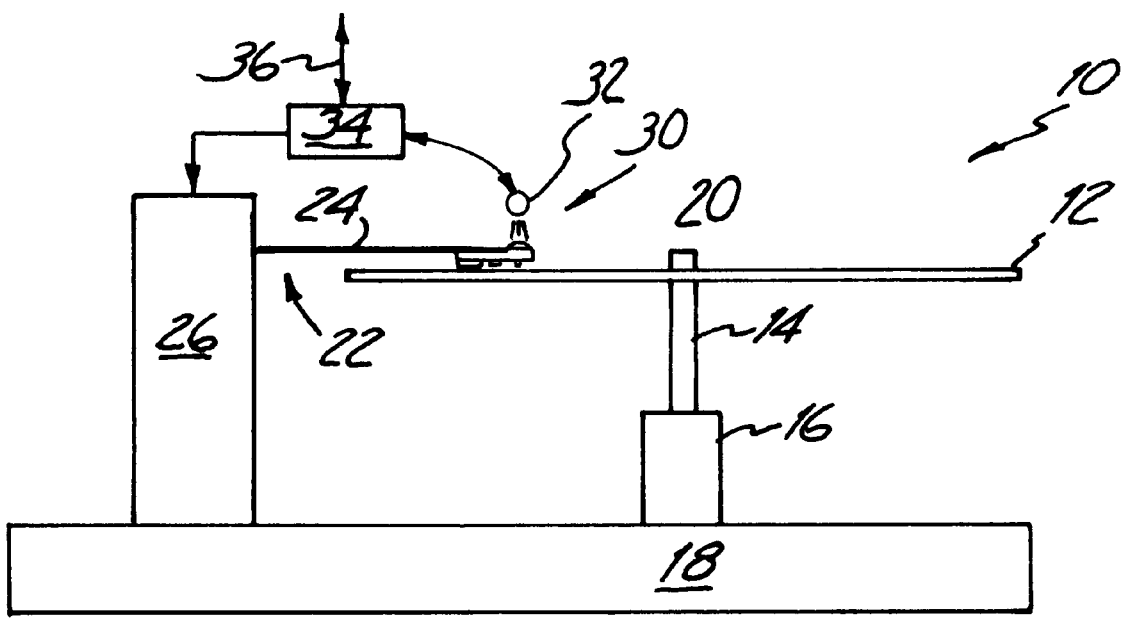
FIG. 1 is a simplified diagram showing an optical storage system in accordance with the present invention.

FIG. 1 is a simplified illustration of an optical recording system 10 employing a slider 20 in accordance with the present invention. System 10 includes optical disc 12 having a data surface which carries optically encoded information. Disc 12 rotates about spindle 14 and is driven by a spindle motor 16 mounted on base 18. The slider 20 is positioned proximate disc 12 and is coupled to an actuator 22 which includes armature 24 and actuator motor 26 which couples to base 18. Slider 20 includes an optical transducer 30. An optical transducing element includes optical source/sensor apparatus 32. A controller 34 couples to apparatus 32, actuator 26 and data bus 36 and is used for controlling operation of system 10.

During operation, disc 12 rotates and slider 20 is positioned radially along the data surface of disc 12 using actuator 22. Controller 34 controls the position of slider 20, whereby information may be read from the data surface of disc 12 using optical source/sensor apparatus 32 and received or transmitted over data bus 36.

FIG. 2 is a simplified side view of slider 20 in accordance with the invention and shows transducer element 30. Slider 20 is shown proximate data surface 48 of optical disc 12 which is illustrated as a series of asperities. Transducer element 30, in the embodiment shown, includes a SIL-type (Solid Immersion Lens) lens (which is formed by lens cap 50 and of the body of slider 20) and electrical conductors 52 formed in a coil shape. Conductors 52 are coiled about optical mesa 54 in accordance with the present invention. Slider 20 includes an air bearing surface 56 and a top surface (or opposing surface) 58. Mesa 54 is carried on air bearing surface 56. Disc 12 rotates in the direction indicated by arrow 60 whereby slider 20 has a leading edge 62 and a trailing edge 64.

In accordance with the present invention, slider 20 shown in FIG. 2 includes a protrusion 70 on air bearing surface 56 which extends in a direction toward data surface 48. Protrusion 70 acts as an air bearing contact region and extends a distance d below the distal edge of mesa 54. Also shown in the embodiment of slider 20 is an air bearing rail 72. Protrusion 70 provides a contacting island region wherein the mesa is recessed from the distal edge of the protrusion 70 in a direction away from the data surface. This configuration prevents damage to the mesa, wear to the mesa, or debris build up on the sensitive optical surface.

The embodiments set forth herein can be fabricated using known techniques such as ion beam etching, machining, lapping, chemical etching, or deposition processes. Preferably, the slider air bearing surface 56 is adapted for interaction with the data surface 48 based upon characteristics of the medium. In general, the recession of the mesa structure with respect to the distal surface may be achieved through any appropriate technique including the physical recession as set forth in FIG. 2 or other techniques such as using the pitch of the air bearing to locate the mesa "upwardly" from the air bearing surface to thereby avoid damage and debris accumulation.

Figure 3A:
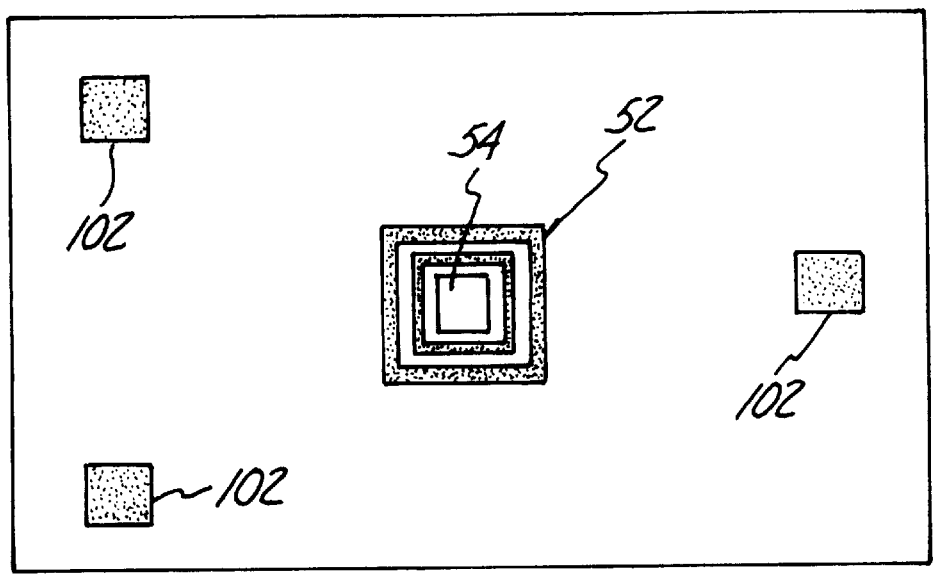
FIG. 3A is a bottom plan view and FIG. 3B is a side plan view of a slider in accordance with another embodiment.
Figure 3B:
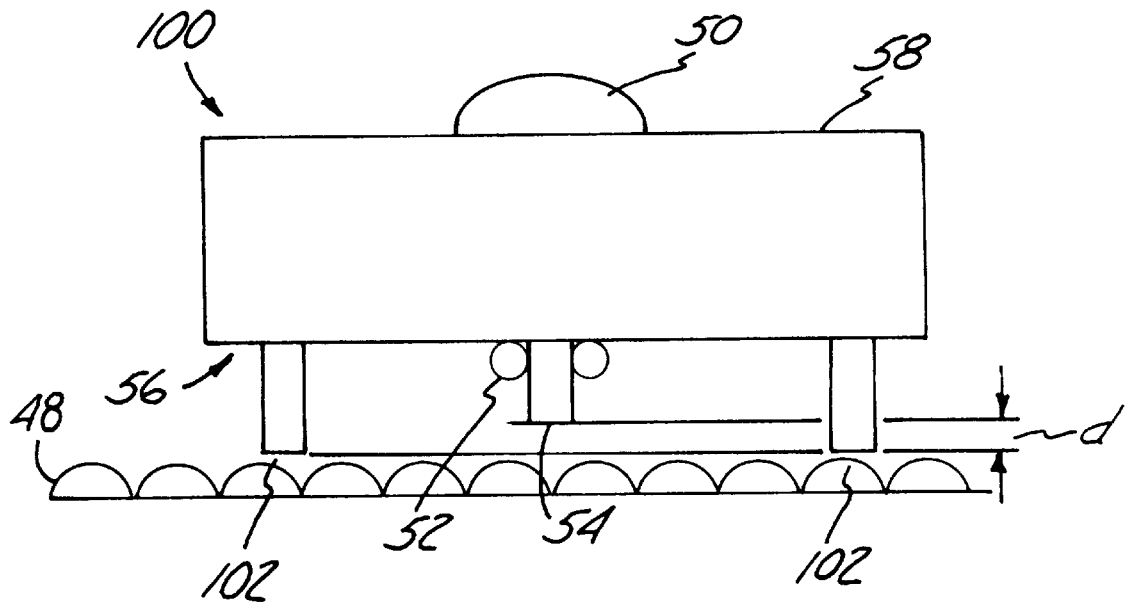

FIG. 3A is a bottom plan view and FIG. 3B is a side plan view of a slider 100 in accordance with another embodiment. In FIGS. 3A and 3B, sacrificial wear pads 102 on the air bearing surface 56 of slider 100 are provided. For simplicity, similar elements have retained their numbering from FIG. 1. This design is particularly well suited for a very low contact force design in which continuous contact between data surface 48 and sacrificial wear pads 102 occurs. Preferably, the total wear on the sacrificial wear pads 102 is less than the distance d by which the mesa is recessed from the wear pads. This design is particularly well suited for many portable applications. The sacrificial pads 102 provide protrusions in accordance with the present invention.

Figure 4:
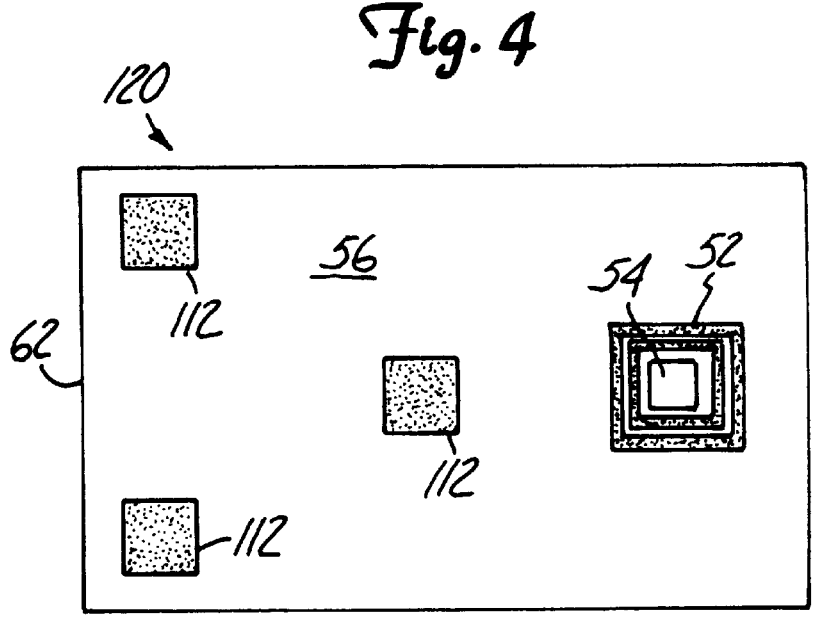
FIG. 4 is a bottom plan view of a slider having protrusions in accordance with another embodiment.

FIG. 4 is a bottom plan view of a slider 120 in accordance with another embodiment. In the embodiment of FIG. 4, wear pads (or protrusions) 112 are positioned closer to the leading edge 62 of air bearing surface 56. The pads form a tripod configuration for stability. However, other configurations are considered to be within the scope of the invention.

Figure 5:
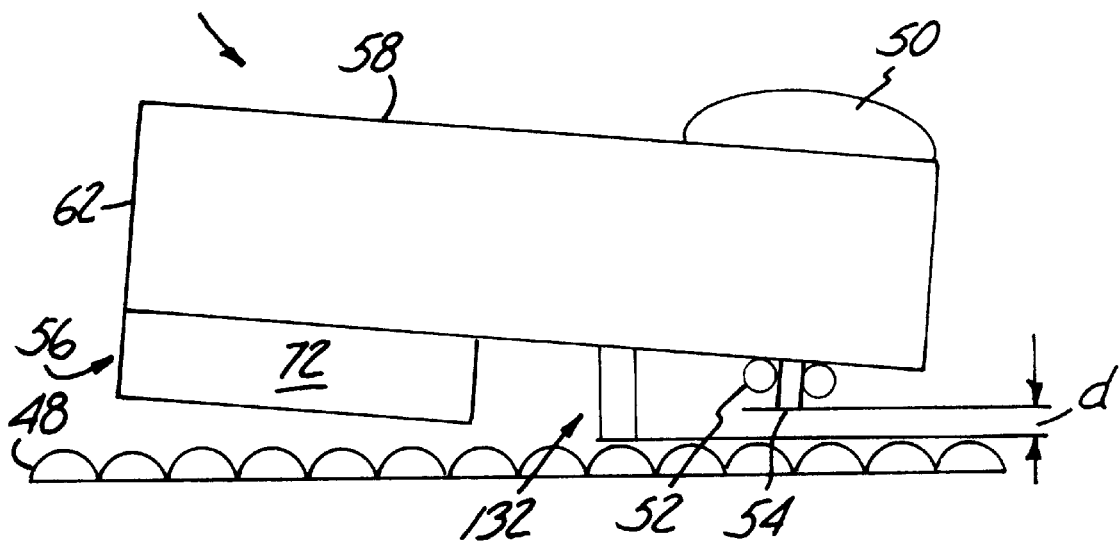
FIG. 5 is a side plan view of a slider having a protrusion between a rail of the slider and a mesa in accordance with another embodiment.

FIG. 5 is a side plan view of a slider 130 in accordance with another embodiment. In the embodiment of FIG. 5, slider 130 includes wear pad or protrusion 132 positioned between mesa 54 and rail 72 to provide the desired recess d. The embodiment of FIG. 5 provides a hybrid design in which the air bearing characteristics of rail 72 provide the desired stiffness for operation and reduced sensitivity to mechanical vibration of slider 130 while any contact occurs on sacrificial wear pad 132.

FIGS. 6A and 6B are side plan views and bottom plan views, respectively, of a slider 140 in accordance with another embodiment of the present invention. In the embodiment of slider 140, the pitch of the slider is used to achieve the spacing d between the mesa 54 and data surface 48. In this design, the mesa 54 is located adjacent rails 72. A trailing pad 142 provides a minimum spacing s at the trailing edge 64 of slider 140 between the air bearing surface 56 and the data surface 48. In this embodiment, the rails 72 and/or trailing pad 142 provide a protrusion in accordance with the present invention. The sliders set forth herein may be fabricated in accordance with any appropriate technique for processing of optical sliders. Furthermore, although the present invention has been illustrated with a Solid Immersion Lens optical element, any appropriate optical element may be used which has a mesa or other protruding optical element for coupling to the data surface through the near field.

Although the present invention has been described with reference to preferred embodiments, workers skilled in the art will recognize that changes may be made in form and detail without departing from the spirit and scope of the invention. The invention may be used with any type of slider design. Further, the protrusion can be positioned to deflect particulate contamination from impacting or building up proximate the mesa.

What is claimed is:

1. An optical disc storage system, comprising:
    an optical storage disc having a data surface;
    an optical mesa on a slider adapted to move adjacent the data surface of the storage disc, the optical mesa extending from an air bearing surface of the slider; and protrusion means for preventing contact between the optical mesa and the data surface of the storage disc as the optical mesa moves adjacent the data surface of the storage disc having a height such that the protrusion means is closer to the data surface than the optical mesa when the slider is moving over the data surface.

2. A method of preventing contact between an optical storage disc and an optical mesa carried on a slider in a disc storage system, comprising:

positioning the mesa on the slider, the mesa extending in a direction away from an air bearing surface of the slider; and positioning a protrusion on the air bearing surface of the slider whereby a distance between a closest portion of the protrusion and the storage disc is less than a distance between the optical mesa and the storage disc during operation of the storage system thereby preventing contact between the mesa and the storage disc when the slider is flying over the storage disc.

3. The method of claim 2 including controlling a pitch angle of the slider to obtain the distance between the optical mesa and the storage disc.

4. The method of claim 2 wherein the step of positioning the mesa comprises positioning the optical mesa between rails of the air bearing surface.

5. The method of claim 2 wherein the step of positioning the protrusion comprises positioning the protrusion along a trailing edge of the slider.

6. The method of claim 2 wherein the protrusion is not subject to substantial wear during the life of the storage system.

7. The method of claim 2 wherein the step of positioning the protrusion comprises a masking and etching process.

8. The method of claim 2 wherein a distance between a front portion of the slider and the storage disc is greater than a distance between a rear portion of the slider and the storage disc and the optical mesa is spaced apart from the rear portion of the slider.

* * * * *